(12) United States Patent
McRedmond

(10) Patent No.: US 8,489,494 B2
(45) Date of Patent: Jul. 16, 2013

(54) SYSTEM AND METHOD FOR BUSINESS TO INVESTOR EXCHANGE FOR RAISING CAPITAL AND FOR CREATING A SECONDARY MARKET FOR PRIVATE EQUITY

(75) Inventor: Kristen McRedmond, San Francisco, CA (US)

(73) Assignee: NETCIRQ, San Francisco, CA (US)

( * ) Notice: Subject to any disclaimer, the term of this patent is extended or adjusted under 35 U.S.C. 154(b) by 0 days.

(21) Appl. No.: 13/083,792

(22) Filed: Apr. 11, 2011

(65) Prior Publication Data

US 2012/0054083 A1    Mar. 1, 2012

Related U.S. Application Data

(63) Continuation of application No. 09/783,499, filed on Feb. 14, 2001, now Pat. No. 7,925,567.

(60) Provisional application No. 60/182,317, filed on Feb. 14, 2000.

(51) Int. Cl.
*G06Q 40/00* (2006.01)
(52) U.S. Cl.
USPC ............. 705/37; 705/35; 705/36 R; 705/38
(58) Field of Classification Search
USPC ...................... 705/35, 36 R, 37, 38
See application file for complete search history.

(56) References Cited

U.S. PATENT DOCUMENTS

| 5,689,650 | A  | * | 11/1997 | McClelland et al. | 705/36 R |
|---|---|---|---|---|---|
| 5,974,406 | A  | * | 10/1999 | Bisdikian et al. | 1/1 |
| 6,233,566 | B1 | * | 5/2001 | Levine et al. | 705/36 R |
| 6,236,972 | B1 | * | 5/2001 | Shkedy | 705/26.1 |
| 6,629,082 | B1 | * | 9/2003 | Hambrecht et al. | 705/36 R |
| 6,691,094 | B1 | * | 2/2004 | Herschkorn | 705/37 |
| 7,925,567 | B2 | * | 4/2011 | McRedmond | 705/37 |

* cited by examiner

*Primary Examiner* — Nga B. Nguyen
(74) *Attorney, Agent, or Firm* — McDonnell Boehnen Hulbert & Berghoff LLP

(57) ABSTRACT

The present invention creates a secondary market in private equities by auctioning venture-backed private equities over the Internet to qualified investors. Typical sources for the private equities will be interests in limited partnerships and pre-IPO or pulled-IPO securities. The operator of the system may sometimes take a position in certain private equities so as to have "inventory" to later sell on the system. In a typical buyer-driven transaction using the present invention, a qualified buyer puts out a bid for private assets in a particular area. Sellers who subscribe to the system receive notice of the bid and can then respond. In a typical seller-driven transaction using the present invention, a seller puts out a notice on the system of equities for sale. Buyers who subscribe to the system receive notice and can respond. Either the buyer or the seller may be charged by the system, depending on the transaction.

20 Claims, 2 Drawing Sheets

SYSTEM AND METHOD FOR BUSINESS TO INVESTOR EXCHANGE FOR RAISING CAPITAL AND FOR CREATING A SECONDARY MARKET FOR PRIVATE EQUITY

RELATIONSHIP TO OTHER APPLICATIONS

The present application is a continuation of U.S. patent application Ser. No. 09/783,499, filed Feb. 14, 2001, now U.S. Pat. No. 7,925,567 and entitled "System And Method For Business To Investor Exchange For Raising Capital And For Creating A Secondary Market For Private Equity," which claims priority under 35 U.S.C. §119(e) from U.S. Provisional Application Ser. No. 60/182,317, filed Feb. 14, 2000, the contents of each of which are fully incorporated herein by reference.

FIELD OF THE INVENTION

This invention relates generally to securing investment capital and establishing a secondary market for equities. More particularly the present invention is a system and method for creation of a secondary market for sale of private equity, both limited partnership interests and individual companies, and sale of restricted stock of public securities. The present invention also creates calls and puts on private equity.

BACKGROUND OF THE INVENTION

Investment capital is the life blood of new ventures. Absent appropriate financing, a company with very good ideas can cease to exist. Whenever a company desires to obtain funding through public or private placements it is necessary for a company to create a business plan, and get the business plan into the hands of appropriate investors of all types both private and institutional so that a judgment can be made as to whether an investment is worthwhile.

Private equity is the fastest growing asset class. However, it is an asset class with the least amount of liquidity. Once perceived as extremely risky, investing in private companies is becoming more widespread as individuals, corporations and traditional conservative institutional investors (mutual funds, insurance companies, etc.) are now investing directly in private companies to pick up incremental return. Additionally, venture capital funds continue to invest at record paces. However, until the full sale or a secondary public offering occurs, there is no marketplace for an investor to sell securities that have been obtained during early round start up of the business. In 1999, over $48 billion poured into private companies in the U.S. alone, up 151% from 1998. The $48 billion represents a nine-fold increase in the last five years. Although the public markets are currently volatile, investments in private companies have continued unabated, as these investors are focused on a 40-year average annual return for venture capital investments of 45%, and the fact that "the performance of venture capital has almost no correlation with the stock market." Despite the fact that all this money keeps pouring in, there is still no marketplace to buy and sell these securities.

One way to sell securities is to convince and investor of the worthwhile nature of the investment that is to be sold. This is typically done by meeting with and providing to investors a wide variety of materials, including business plans, presentations, and other supporting documents. The difficulty with having such business plans and documents reviewed is that investors are frequently inundated with business plans and hence do not have a sense of urgency in reviewing the business plans and making their investments decisions. Further, many such submissions are made to investors in a "shotgun" fashion without regard to the actual interests of the investors.

What would be truly be useful is a system and method for providing a secondary market for securities that is accessible by accredited investors over a network. Such a systems would provide targeted marketing of securities to investors that match the interests of the investor with the type of security available for sale. Such a system would allow, in an automated way, a review of business plans and ancillary documents in an efficient and effective manner, such that an investment decision can be rendered by institutional and private investors. Such a system would utilize, preferably, but without limitation, the Internet to create the marketplace, thereby establishing a secondary market for the buying and selling of private equities, both of individual companies and of limited partnership interests.

SUMMARY OF THE INVENTION

It is therefore an object of the present invention to establish a secondary market for the buying and selling of traditionally illiquid securities over a network.

It is yet another object of the present invention to create a server based secondary market for private equities when individual investors wish to cash in on their initial investment.

It is a further object of the present invention to create a secondary market to permit the buying and selling of private equities and interests in limited partnerships.

It is yet another object of the present invention to create a secondary market for the resale of restricted stock of public securities.

It is another object of the present invention to create calls and puts on private equities, both on individual companies and on limited partnership interests.

It is still another object of the present invention to register buyers of securities and their specific interests so that securities offerings can be targeted to those investors having the appropriate interest.

It is a further object of the present invention to qualify both businesses and investors to view business plans of entrepreneurs in a timely fashion.

It is a further object of the present invention to prescreen those securities that are available to investors to permit only the highest quality securities to be available for investment.

It is yet another object of the present invention to assist entrepreneurs in developing an appropriate business plans for review by investors.

It is a further object of the present invention to create a video or other audio visual interactive presentation method for an entrepreneurs to present the business opportunity to investors.

It is yet another object of the present invention to assist entrepreneurs in creating the business plans and in facilitating the presentation of those business plans to institutional and private investors.

It is yet another object of the present invention to present a brief video or other audio-visual presentation by the actual entrepreneur over a network to those investors who are interested in potentially investing in the business opportunity.

It is a further objective of the present invention to create a server system on the Internet that "pushes" audio-visual presentations of business opportunities to qualified investors.

These and other objectives of the present will become apparent to those skilled in the art by a review of the specification that follows.

The present invention is a system and method for creating a secondary market for otherwise illiquid securities over a network that is preferably, but without limitation, the Internet. Using the present invention, a vehicle is created that provides liquidity for this illiquid market and creates an alternative exit strategy for Venture capitalists (VCs), investors, incubators, angels round financiers, pension funds, corporations, and founders. Founders and officers are able to liquidate a non-material portion of their equity, enabling diversification, providing liquidity, and capitalizing on the progress of the company.

One aspect of the present invention is that all sellers of securities will have those securities prescreened prior to them being available for marketing over the system of the present invention. For example, it is not the intention of the present invention to sell just any security that a seller desires. Rather, only those securities that are venture backed and have an established advisory board assisting the corporation are permitted to be offered for sale using the system and method of the present invention. This litmus test is not the only means of assuring quality securities. Other verification and vetting procedures known in the industry can also be used to assure that only quality securities are available.

Qualified investors register with the system of the present invention. As part of the qualification, financial information is obtained that permits a judgment that the investor is indeed a qualified one. Along with such qualification information, the investor also creates an investment profile that notes, if desired, the types of securities in which the investor is most interested. This is kept in an accredited investor file on the server of the present invention. When appropriate securities are made available for sale, the investor is notified if the investment fits the investor profile.

As noted above, securities are first qualified as being of appropriate quality using criteria such as, and without limitation, VC backed investments. Once the security is qualified and prescreened, it can then be sent together with a synopsis page and a brief video to those who might be interested in purchasing the security. The present invention also performs due diligence on buyers so that they are noted as qualified investors.

Once a particular buyer is interested in a security, the present invention assists and facilitates in the due diligence necessary for buyers to perform before actually purchasing the security in question. The present invention can link buyers with sellers in conference calls and assist in scheduling conferences between buyers and sellers to facilitate the sale.

In addition to the various videos and business plans, which are anticipated to be distributed by the present invention, other business agreements are also stored in the storage associated with the systems server of the present invention. For example share holders agreements, business plans, financial information, capitalization tables, corporate charters, are all documents that will be readily accessible to qualified investors once they have been qualified. In 0 short, the system will not allow access of simply anyone to this information but on to qualified buyers. Further, the information that will be available will be only that information which has been prescreened and meets certain quality characteristics.

Thus the present invention is not a listing service but rather is an exchange marketplace, operating over a network, wherein certain safeguards have been applied and wherein buyers and sellers are placed together so that they can make an independent judgment regarding the purchases and sale of a particular security.

Major sources of securities to be sold may be derived from those IPO's which were projected to be accomplished but which were pulled for various reasons. Typically such potential IPO's represent a desire by a company to obtain investment capital and therefore represent an opportunity for securities in a secondary market to be sold to develop that capital in the event that the IPO does not take place.

In summary, the present invention is a system and method for trading private equity in a secondary market over a network. Thus a retro capitalist, a founder, or any investor will be able to sell all or part of their equity via the network. Only qualified individual buyers will be permitted to participate in this private equity transaction.

In certain instances the organization administering this private equity market will be able to take positions by purchasing private equity. This will result in the entity having an inventory of securities in the various companies who desire to sell private equity. The private equity can then be offered to other individuals who may be interested in obtaining that private equity from time to time.

Profiles for qualified institutional buyers are developed as part of the present invention and, where the profile so indicates, the system of the present invention introduces qualified 0 institutional buyers to those selling private equity that matches the profile of interest of the qualified institutional buyers.

By dealing with venture-backed companies only, there is more of an opportunity that due diligence has been performed on the company especially those companies that have later stage venture-backed capital.

Using the system of the present invention, buyers may drive a particular transaction by putting out a bid or notice that they are interested in a particular type of private equity asset. That information request can proceed to the server of the present invention with a bid being sent to private companies who have the type of asset desired by the buyer.

The business model of the present invention permits the establishment of a first-of-its-kind secondary market for traditionally illiquid securities over the Internet. It also allows the entity that runs the system of the present invention to charge sellers when securities are sold. However this is not meant as a limitation. If a buyer is driving the transaction, the buyer may be charged a transaction fee as a result of the system of the present invention introducing the buyer to sellers of securities of interest to the buyer.

The types of securities to be sold using the system of the present invention are any secondary interests in, for example, limited partnership interests, private direct companies, and portfolios of direct private companies. The system will enable calls, puts, and other derivative structures on limited partnership interests, private direct companies, and portfolios of private direct companies.

In yet other operations of the present invention, affiliations with lending institutions will allow loans against private equities to take place.

DETAILED DESCRIPTION OF THE INVENTION

As noted above, the present invention is a system and method for creating a secondary market for otherwise illiquid securities over a network that is preferably, but without limitation, the Internet. The system is server and network based, as more fully set forth below.

In a basic embodiment, the present invention auctions venture-backed private equities over the Internet to qualified investors. Typical sources for the private equities are pre-IPO securities and securities from pulled IPO's. The operator of the system may sometimes take a position in certain private equities (i.e., a "put") so as to have "inventory" to later sell on the system.

In a typical buyer-driven transaction using the present invention, a qualified buyer puts out a bid for private assets in a particular area. Sellers who subscribe to the system receive notice of the bid and can then respond.

In a typical seller-driven transaction using the present invention, a seller puts out a notice on the system of equities for sale. Buyers who subscribe to the system receive notice and can respond.

Either the buyer, the seller, or both may be charged by the system, depending on the transaction.

Figure 1:
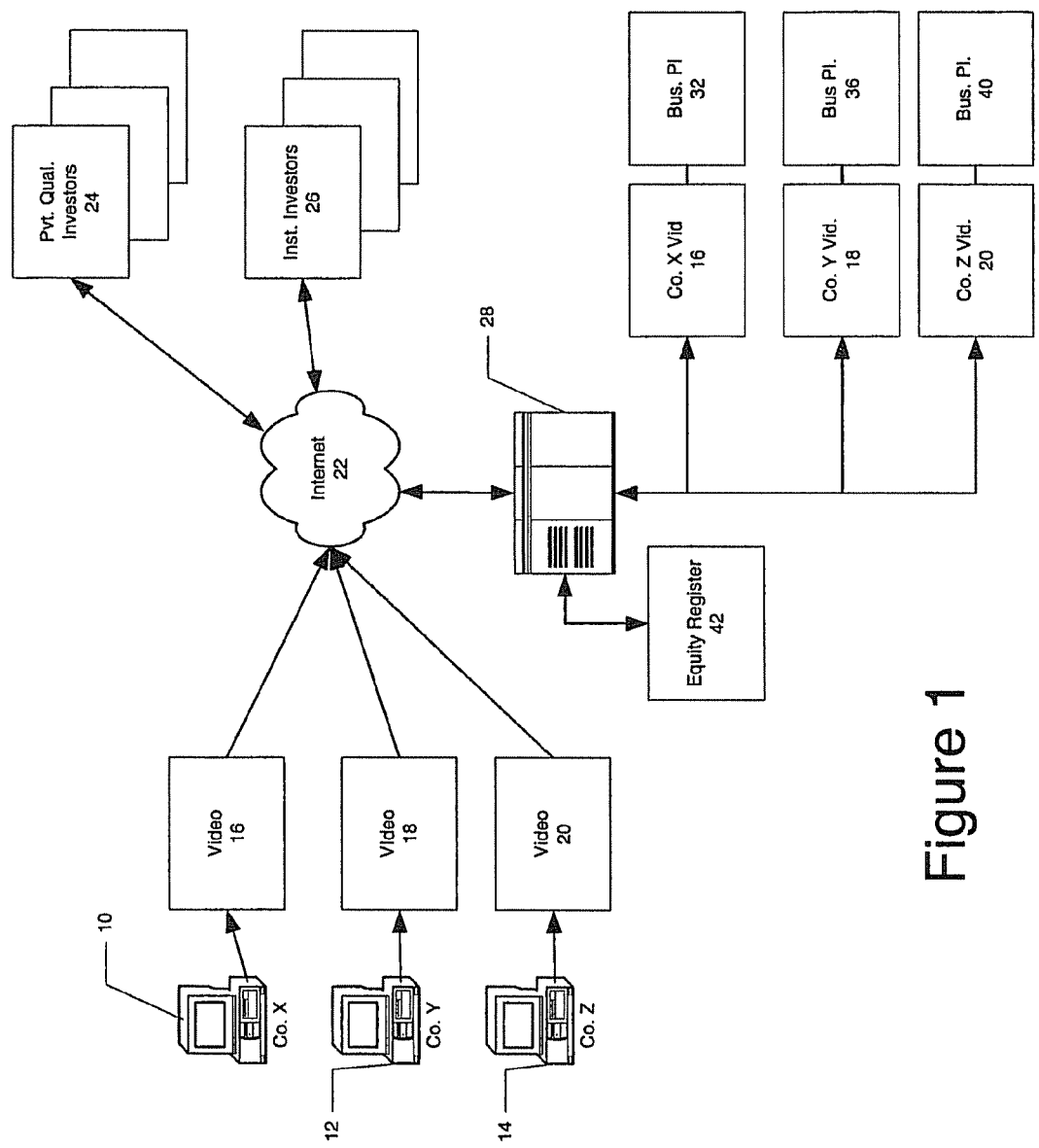
FIG. 1 is an overview of the conceptual architecture of the business to investor network.

Referring first to FIG. 1, the overall conceptual architecture of the business to investor network is illustrated. Businesses 10, 12, 14 requiring investment funding create a brief video, and a business plan (preferably no more than five minutes) which will be used to present the officers of the company and the business investment opportunity to investors. These videos 16, 18, and 20 are prepared and sent via network 22 that is preferably, but without limitation, the Internet to the business investor server 28. The server 28 then stores both the video for each individual company 16, 18, and 20 together with the associated business plan 32, 36, and 40 for the respective company. The organization running the server 28 of the present invention also qualifies both individual investors 24 and institutional investors 26 such as pension funds, insurance companies, and the like. Once these individual and organizational investors are qualified, they receive both access to the data base of the server 28 and are registered investors with the system.

Part of the registration process is to provide the point of contact and the associated electronic mail address to which information can be sent.

Upon receipt of a business opportunity and request for investment funds, the server 28 "pushes," via e-mail, the video presentation 16, 18, and 20 to the individual investors 24 and the institutional investors 26 over the Internet 22. The investors can then view the five minute video presentation and, if interested, can review an associated business plan 32, 36, and 40 which is attached to the e-mail that is sent to the investors. Alternatively, the investors can access the server 28 of the present invention and directly access the business plans that are stored on the server.

It should be noted that the use of the Internet 22 is the preferred medium for transmission of the investment opportunities. However this is not meant as a limitation. Other intranets, and wireless networks would also satisfy for the transmission of the associated information.

With the bandwidth available to those on the Internet increasing dramatically in recent times, the transmission of video information over the Internet is today a reality. Thus, it is a simple matter to transmit a five minute presentation by the Chief Executive Officer of a particular company from the server 28 of the present invention to the individual and institutional investors who have interest in receiving such presentations.

Figure 2:
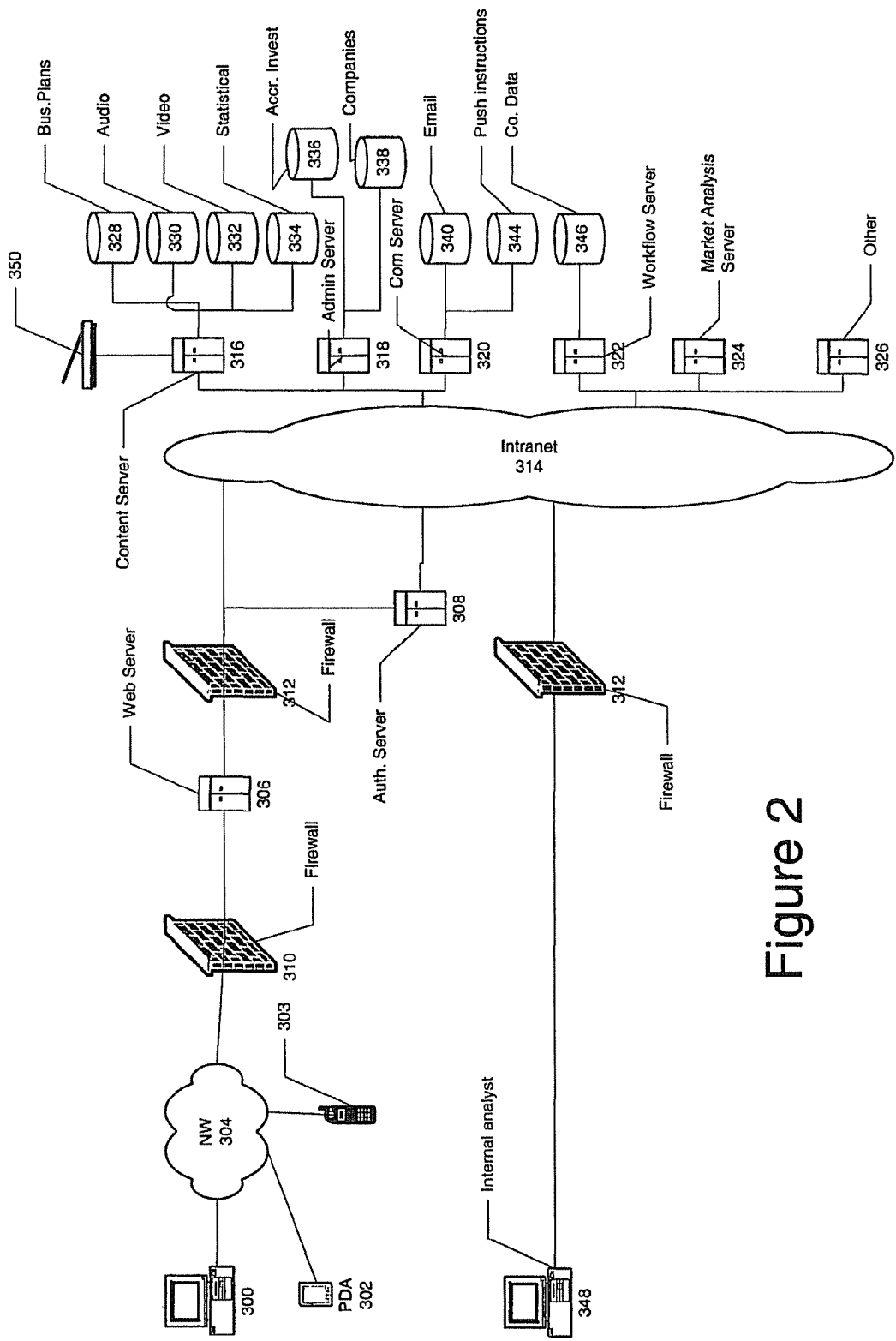
FIG. 2 illustrates one architecture of the present invention.

Referring to FIG. 2, the system architecture of the present invention is illustrated. The system operates with a series of servers, generally represented as a server functionality which gives rise to the various functions of the present invention. Users 300, who are accredited and investors access the system over the Internet 304. It should also be noted, however, that personal computers 300 are not the only way to access the present invention. For example, personal digital assistants having wireless capability 302 can also be connected to the network, as can cellular telephones having the capability to interact over the Internet. Such cellular telephones 303 connect to the network typically over the cellular network and thereafter can access the system over the Internet 304. When accessing the system of the present invention, an initial firewall 310 is in place to add security to the functionality of the present invention. Web server 306 provides the web service to the various users over the Internet 304. When a user desires to either register or research information relating to trades, the user accesses the system via the web server 306 and provides appropriate identification. Web server 306 then accesses an authorization server 308 via an internal firewall 312. These firewalls 310, 312 provide additional security to the overall system only allowing accredited investors or accredited companies to place securities on the system or place trades over the system.

Once authorization server 308 verifies that the user 300 is authorized to access the system, the user can obtain information from the server functionality over an intranet 314 to which the various server functionalities are connected.

For example, content server 316 stores various content associated with qualified investments. Business clients 328, audio information 330, video information 332, and statistical information 334 are all stored in storage that is associated with content server 316. In addition, content server 316 has additional input 350 which comprises scanners, or other type of input that allow other type of information from companies to be stored on the various databases associated with the content server.

Administration server 318 administers and stores information on accredited investor storage 336. Also, those companies that have securities to be sold are stored in database 338. It should be noted that this is information that relates to the investors and the companies and not the specific content that is to be served to the accredited investors. Thus, the database of profiles of the investors is stored in the accredited investor database 336. This information comprises contact information and information relating to the interest level of the accredited investor in particular types of investments.

Communications server 320 manages all of the communications associated with the present invention. It allows for e-mail between companies and accredited investors and between the entity that runs the present invention and the accredited investor. E-mail information is stored in e-mail database 340, which is associated with communications server 320. In addition, communications server 320 stores push instructions 344, which, in association with e-mail stored in the e-mail database 340 allows for certain information on the content server to be "pushed" to the e-mail of accredited investors who have expressed particular interest in certain types of investments.

Work flow server 322 manages the work flow associated with bringing new companies and securities for sale into the system of the present invention as well as to manage the overall work flow associated with registering an accredited investor. Information concerning companies, corporate data and other related data are stored in database 346, which is associated with workflow server 322.

Market analysis server 324 provides additional statistical information and research information to investors who desire to research a market in association with the particular investment that they wish to make. Provision is also made in the present invention for additional servers 326 to handle other types of workloads.

It should be noted that the system of the present invention is scalable by simply adding additional servers to the various functionality together with load balancing servers so that the work load on any one server and functionality is even. This, in addition, optimizes the response to investors 300 who desire to access the system for investment purposes.

In addition to the access over the network, provision is made in the present invention for internal analysts 348 to access the system over intranet 314. To do so, such internal analysts 348 access the system through firewall 312 and only after providing appropriate identification to the system. In this way, internal security is maintained for those analysts as well.

Another aspect of the business model of the present invention is that the presentation of these investment opportunities are for a limited time only. This has particular advantages.

At the present time it could take any where from three to six months in order for a business plan to be reviewed by private investors. This is due to the large volume of such business plans that are typically received by both individual and private investors. When a company submits such a business plan it does so in the hopes of garnering the interest of such investors. However no time table is typically set for such a response. Therefore, the entrepreneurs are left with no knowledge of when, if ever, funding will arrive. Alternatively the entrepreneur might be forced to accept an offer from a single investor which may not be the best offer for the company.

Using the system and method of the present invention, entrepreneurs can be assured that their business plans will be sent to a number of appropriate investors, some of whom may be initially unknown to the entrepreneur.

On the investor decision side, the investors are aware, when they sign up for the service of the present invention, that there will be a limited period of time during which they have to respond. Those investors who do respond within an appropriate period of time set by the entity managing the server of the present invention will have their offers considered. In this fashion, some pressure is placed upon the investors to make timely offers. In addition, by having such pressure placed upon the investment community, more serious offers will be received by the server of the present invention in a timely fashion, for distribution to the entrepreneurs.

Secondary Market

An additional problem subsequently occurs in selling securities in which an investor invests on a secondary market. This situation occurs when an investor wishes to capitalize on an initial investment prior to an IPO occurring. Typically equities available on the secondary market are made available to institutional investors. Individual investors are typically not informed of the availability of such equities on the secondary market, and if they are informed, it is typically too late.

Thus the present invention also comprises a file of equities that are offered on the secondary market which are connected to the server of the present invention. When the individual investor or institutional investor wishes to sell some securities on the secondary market, those securities are made available through the server of the present invention. The server then "pushes" e-mail and associated information relating to the equities to be offered. Individual and institutional investors have an opportunity then to respond to the offers of the sale of the equity on the secondary market. Again a time schedule is set for offers. The highest bidder for the equity offered during the time period buys the equity.

Another aspect of the present invention is that a certain percent of the equities that are available on the secondary market will be specifically made available to individual investors. In this fashion institutional investors will not be the only ones who can benefit from the sale of such equities the secondary market.

A further aspect of the present invention is that the securities that are offered on the secondary market will be those securities that had originally been reviewed and approved by the entity that runs the server of the present invention. Thus the server will be offering the same securities on the secondary market as it helped place in private placement initially. Thus investors can have some additional assurance that the products being sold are in fact those products deemed to be worthwhile in the first instance to be sold to investors initially.

The typical equipment needed for the present invention comprises an assembly of standard servers, with an exemplary embodiment illustrated as follows:

The Web Server comprises:
Dell 6450 w14 Intel 700 MHz Xeon Processors 36 GB Ultra 3 SCSI Hard disk
4 GB SDRAM
2 Intel Pro 1000 Gigabit Network Interface Cards
The Content Server:
Dell 6450 w14 Intel 700 MHz Xeon Processors
4-36 GB Ultra 3 SCSI Hard disks (usable capacity depends on RAID configuration)
8 GB SDRAM
2 Intel Pro 1000 Gigabit Network Interface Cards
Additional external storage may be added (either SCSI or Fibre Channel)
All other servers:
Dell 2450 w/1 Intel 733 Mhz Pentium III
36 GB SCSI Hard Disk
1 GB SDRAM
1 Intel Pro 1000 Gigabit Network Interface Card These servers are illustrative of the type of server that will find utility with the present invention. Other servers from, for example IBM, Sun Microsystems and Compaq will also be useful with the present invention, so long as they have the same or similar capabilities.

Similarly, there are no special requirements for the workstations that access the system either via the intranet 314 or over the Internet. PC or PC compatible workstations running Windows, Windows NT, Windows 2000, having a web browser such as Netscape or Microsoft Explorer, having an Intel, AMD or other processor with associated RAM and storage will all be useful for the present invention.

Assistance in generating the brief video to be distributed to investors is made by the entity that is administering the server of the present invention or some entity that is contracted for by the server manager. In this fashion a consistent high quality product can be generated for subsequent distribution.

A system and method for the generation of investment interest between business and investors has been illustrated together with a system and method for the sale of equities on the secondary market. By virtue of the novel use of a brief video clip, investors will be more inclined to deal with a particular firm than they would otherwise be based solely upon seeing a written product. Thus the present invention enhances the person-to-person relationship between an entrepreneur and an investor and encourages subsequent meetings between the parties.

It will be appreciated by those skilled in the art that other embodiments of the present invention are possible without departing from the scope of the invention as disclosed.

I claim:

1. A method for creating a secondary market for private equity, the method comprising:

prescreening securities based on private equity to ensure that the securities meet at least one predetermined criteria, wherein the at least one predetermined criteria comprises that the securities are securities selected from the group consisting of venture-backed securities, private-equity-backed securities, and limited partnership interests;

registering in a computer database the prescreened securities based on private equity as well as derivative structures of the prescreened securities based on private equity;

receiving registration information for accredited investors;

a computer making a determination that at least one of the accredited investors is interested in a given security of the prescreened securities or a derivative structure based on the given security; and auctioning the given security or the derivative structure based on the given security to the at least one accredited investor over an electronic network.

2. The method of claim 1, wherein the computer making a determination that at least one of the accredited investors is interested in a given security of the prescreened securities or a derivative structure based on the given security comprises the computer receiving a bid from the at least one accredited investor for the given security or the derivative structure based on the given security.

3. The method of claim 1, further comprising collecting investor-specific investment profile information from the accredited investors, wherein the information specifies types of securities preferences in which the accredited investors are interested;

and wherein the computer making a determination that at least one of the accredited investors is interested in a given security of the prescreened securities or a derivative structure based on the given security comprises determining that the given security or the derivative structure based on the given security matches the investor-specific investment profile of at least one of the accredited investors.

4. The method of claim 1, wherein the auctioning is conducted over the Internet.

5. The method of claim 1, further comprising:
creating and storing audio-visual information and a business plan for the given security; and
allowing the at least one accredited investors access, over the Internet, to the audio-visual information and business plan for the given security.

6. The method of claim 1, further comprising charging a seller of the given security a transaction fee.

7. The method of claim 1, further comprising charging a buyer of the given security or a derivative structure based on the given security from the auction a transaction fee.

8. The method of claim 1, wherein auctioning the given security or a derivative structure based on the given security to the at least one accredited investor over an electronic network comprises notifying, by e-mail, the at least one accredited investor of a seller offering for sale the given security or the derivative structure based on the given security.

9. The method of claim 1, wherein auctioning the given security or the derivative structure based on the given security to the at least one accredited investor over an electronic network comprises notifying a seller of the given security of a bid for the given security.

10. The method of claim 1, wherein the derivative structures of the prescreened securities based on private equity comprise puts and calls based on the prescreened securities.

11. A method for creating a secondary market for private equity, the method comprising:
prescreening securities based on private equity to ensure that the securities meet at least one predetermined criteria, wherein the at least one predetermined criteria comprises that the securities are securities selected from the group consisting of venture-backed securities, private-equity-backed securities, and limited partnership interests;
registering in a computer database the prescreened securities based on private equity;
receiving registration information for accredited investors;
a computer making a determination that at least one of the accredited investors is interested in a given security of the prescreened securities; and
auctioning the given security to the at least one accredited investor over an electronic network.

12. The method of claim 11, wherein the computer making a determination that at least one of the accredited investors is interested in a given security of the prescreened securities comprises the computer receiving a bid from the at least one accredited investor for the given security.

13. The method of claim 11, further comprising collecting investor-specific investment profile information from the accredited investors, wherein the information specifies types of securities preferences in which the accredited investors are interested;
and wherein the computer making a determination that at least one of the accredited investors is interested in a given security of the prescreened securities comprises determining that the given security matches the investor-specific investment profile of at least one of the accredited investors.

14. The method of claim 11, wherein the auctioning is conducted over the Internet.

15. The method of claim 11, further comprising:
creating and storing audio-visual information and a business plan for the given security; and
allowing the at least one accredited investors access, over the Internet, to the audio-visual information and business plan for the given security.

16. The method of claim 11, further comprising charging a seller of the given security a transaction fee.

17. The method of claim 11, further comprising charging a buyer of the given security from the auction a transaction fee.

18. The method of claim 11, wherein auctioning the given security to the at least one accredited investor over an electronic network comprises notifying, by e-mail, the at least one accredited investor of a seller offering for sale the given security.

19. The method of claim 11, wherein auctioning the given security to the at least one accredited investor over an electronic network comprises notifying a seller of the given security of a bid for the given security.

20. A system for creating a secondary market for private equity, the system comprising:
a system operator server facility connected to an electronic network, the server facility comprising:
database storage; and
a server storage device having instructions, which when executed, cause the system to:
(i) prescreen securities based on private equity to ensure that the securities meet at least one predetermined criteria, wherein the at least one predetermined criteria comprises that the securities are securities selected from the group consisting of venture-backed securities, private-equity-backed securities, and limited partnership interests;
(ii) register in a computer database the prescreened securities based on private equity;
(iii) receive registration information for accredited investors;
(iv) make a determination that at least one of the accredited investors is interested in a given security of the prescreened securities; and
(v) auction the given security to the at least one accredited investor over an electronic network.

* * * * *